US006155963A

United States Patent [19]

Simmons

[11] Patent Number: 6,155,963

[45] Date of Patent: Dec. 5, 2000

[54] CUSHIONING CONVERSION MACHINE WITH POWER INFEED

[75] Inventor: James A. Simmons, Painesville Township, Ohio

[73] Assignee: Ranpak Corp., Concord Township, Ohio

[21] Appl. No.: 09/123,901

[22] Filed: Jul. 28, 1998

Related U.S. Application Data

[60] Provisional application No. 60/053,963, Jul. 28, 1997.

[51] Int. Cl.[7] .............................. B31B 1/00; B23Q 15/00; B65H 23/18

[52] U.S. Cl. ........................ 493/464; 493/967; 242/418.1; 226/44

[58] Field of Search ..................................... 493/464, 967; 53/389.2, 389.4; 83/236; 242/418.1, 422.5; 226/44

[56] References Cited

U.S. PATENT DOCUMENTS

| | | | |
|---|---|---|---|
| 3,702,086 | 11/1972 | Moss | 83/236 |
| 3,762,253 | 10/1973 | Loomis, Jr. et al. | 83/236 |
| 4,026,198 | 5/1977 | Ottaviano | 493/464 |
| 4,085,662 | 4/1978 | Ottaviano | 493/464 |
| 4,429,602 | 2/1984 | Vits | 83/236 |
| 4,657,164 | 4/1987 | Felix | 226/42 |
| 4,693,053 | 9/1987 | Ballestrazzi et al. | 83/236 |
| 5,123,889 | 6/1992 | Armington et al. | 493/967 |
| 5,186,409 | 2/1993 | Kansaku | 242/75.44 |
| 5,674,172 | 10/1997 | Armington et al. | 493/464 |

FOREIGN PATENT DOCUMENTS

| | | |
|---|---|---|
| 0 523 382 | 1/1993 | European Pat. Off. . |
| 95 31296 | 11/1995 | WIPO . |
| 96 15968 | 5/1996 | WIPO . |
| 96 24540 | 8/1996 | WIPO . |
| 96 40496 | 12/1996 | WIPO . |

*Primary Examiner*—Brian L. Johnson
*Assistant Examiner*—Matthew Luby
*Attorney, Agent, or Firm*—Renner, Otto, Boisselle & Sklar, LLP

[57] ABSTRACT

A cushioning conversion machine and method for converting sheet stock material into a relatively low density cushioning dunnage product. The machine has at least one conversion assembly for forming the stock material into a three-dimensional shape and a power infeed mechanism which supplies sheet material at a tension that does not exceed a predetermined level. A preferred embodiment of the infeed mechanism includes a powered roller that is driven at a surface speed that is faster than the speed at which a conversion assembly draws the sheet material over the former. A pressure roller presses the sheet material against the powered roller so that the sheet material is supplied to the conversion assembly. The force of the pressure roller is controlled so that the sheet material is supplied to the former at the same rate the former draws in the material, as by means of a dancer that bears against a loop of material between the pressure roller and the conversion assembly. When the conversion assembly draws in sheet material, the loop decreases in size and this shifts the dancer which in turn causes the pressure roller to press the sheet against the power roller to feed additional sheet material into the loop. Thus, the sheet material is kept at or below a selected tension as it is supplied to the conversion assembly.

14 Claims, 5 Drawing Sheets

CUSHIONING CONVERSION MACHINE WITH POWER INFEED

This application claims benefit to provisional application No. 60/053,963 filed Jul. 28, 1997.

FIELD OF THE INVENTION

The invention herein described relates generally to cushioning conversion machines and more particularly to improvements in the mechanisms for feeding material into such machines for conversion into a dunnage product.

BACKGROUND OF THE INVENTION

In the process of shipping an item from one location to another, protective packaging material is often placed in the shipping container to fill any voids and/or to cushion the item during the shipping process. Some commonly used protective packaging materials are plastic foam peanuts and plastic bubble pack. While these conventional plastic materials seem to perform adequately as cushioning products, they are not without disadvantages. Perhaps the most serious drawback of plastic bubble wrap and plastic foam peanuts is their affect on our environment. Quite simply, these plastic packaging materials are not biodegradable, and therefore they cannot avoid further multiplying our planet's already critical waste disposal problems. The non-biodegradability of these packaging materials has become increasingly important in light of many industries adopting more progressive policies in terms of environmental responsibility.

The foregoing and other disadvantages of conventional plastic packaging materials have made paper protective packaging material a popular alternative. Paper is biodegradable, recyclable and composed of a renewable resource, making it an environmentally responsible choice for conscientious shippers.

While paper in sheet form could possibly be used as a protective packaging material, it is usually preferable to convert the sheets of paper into a relatively low density pad-like cushioning or dunnage product. This conversion may be accomplished by a cushioning conversion machine, such as that disclosed in commonly assigned U.S. Pat. No. 5,123,889. The conversion machine disclosed in U.S. Pat. No. 5,123,889 converts sheet stock material, such as paper in multi-ply form, into relatively low density pads. Specifically, the machine converts this stock material into a continuous unconnected strip having lateral pillow portions separated by a thin central band. This strip is connected as by coining along its central band to form a coined strip which is cut into sections, or pads, of a desired length. The stock material preferably consists of three superimposed webs or layers of biodegradable, recyclable and reusable thirty-pound Kraft paper rolled onto a hollow cylindrical tube. A thirty-inch wide roll of this paper, which is approximately 450 feet long, weighs about 35 pounds and will provide cushioning equal to approximately sixty cubic feet of plastic foam peanuts while at the same time requiring less than one-thirtieth the storage space.

The conversion machines known in the prior art, including the one shown in U.S. Pat. No. 5,123,889, have used a freely rotating roll from which the stock material to be converted is fed by means of the same mechanism that advances the material through the forming portion of the machine. Specifically a pair of gears that have performed a connecting operation have been used to advance the material being converted. These gears stop and start their rotation during the conversion process, and this results in the need to accelerate the stock roll every time the gears start, with resulting changes in the tension of material being fed through the conversion machine. These changes in the tension of the material can affect the quality of the dunnage product being produced.

Also, when the conversion process is stopped, the rotational inertia of the stock roll can cause the stock roll to overrun and form a loose loop of material at the supply end of the conversion machine. When the conversion process is resumed, initially the material will be at a relatively low tension until the loose loop of material is taken up, at which point the tension on the paper will rapidly increase, almost instantaneously, to a relatively high level until the stock roll accelerates to match the feed rate through the machine. This quick change in tension can cause the material to tear, as well as degrade the quality of the dunnage product being produced.

SUMMARY OF THE INVENTION

The present invention provides a cushioning conversion machine with a power infeed mechanism which eliminates one or more problems associated with prior art conversion machines. The machine and associated method advantageously utilize the power infeed mechanism to isolate the sheet stock material being fed through the conversion assembly of machine from changes in loads acting on the sheet material upstream of the power infeed mechanism, while also eliminating problems such as overrunning of a stock roll. The power infeed mechanism preferably includes a pair of relatively movable infeed members located upstream of the conversion assembly. The sheet material to be converted into a dunnage product is fed between the infeed members, at least one of which is rotatably driven. The infeed members are relatively movable to urge the material into frictional engagement with the rotatably driven infeed member with a force that varies in relation to the tension acting on the material downstream of the infeed members. When the material is frictionally pressed against the rotatably driven infeed member by the other infeed member, the material will be fed thereby.

In a preferred embodiment, the infeed members are a pair of infeed rollers between which the material is pinched when the rollers are brought together. The material is formed into a loop downstream of the infeed rollers and upstream of the conversion assembly. The frictional engagement force between the material and the infeed rollers is controlled by a dancer which rests against the loop and is operatively connected to one of the infeed members, i.e., a pressure roller, for varying the relative position thereof in response to movement of the dancer. When the size of the loop decreases, the dancer is moved by the contracting loop to effect corresponding movement of the pressure roller to increase the pressure on the sheet material in the nip between the two infeed rollers until the loop is restored to a desired size. The other infeed roller, i.e., power roller, is driven (preferably continuously) at a feed rate greater than the feed rate of the conversion assembly and more particularly the feed rate of a pair of feed gears or wheels of the conversion assembly. In this manner, the tension acting on the material can be isolated from the load of a stock roller. Also, in a preferred embodiment, a brake or other suitable device is used to provide a constant drag on the material being supplied to the machine from a supply source, for example a stock roll. The brake preferably acts on the stock roll to prevent overrunning upon stoppage of the conversion process.

More generally, the invention provides an infeed device which varies the advancement or drag on the incoming stock material in relation to the tension acting on the stock material. In a preferred embodiment the infeed device is powered to feed the stock material to the conversion assembly or assemblies with the feed rate and/or driving force acting on the stock material being varied in relation to the tension acting on the stock material, generally increasing the feed rate and/or driving force when the tension increases relative to a prescribed amount (set value or range), and conversely when the tension decreases. In this manner, the infeed device can maintain the tension acting on the paper below an amount that may cause tearing of the stock material or improper formation of the dunnage product, and preferably within a prescribed operating tension range for optimal formation of the dunnage product.

The present invention provides the foregoing and other features hereinafter fully described and particularly pointed out in the claims, the following description and annexed drawings setting forth in detail a certain illustrative embodiment of the invention, this embodiment being indicative, however, of but one of the various ways in which the principles of the invention may be employed.

DETAILED DESCRIPTION

Figure 1:
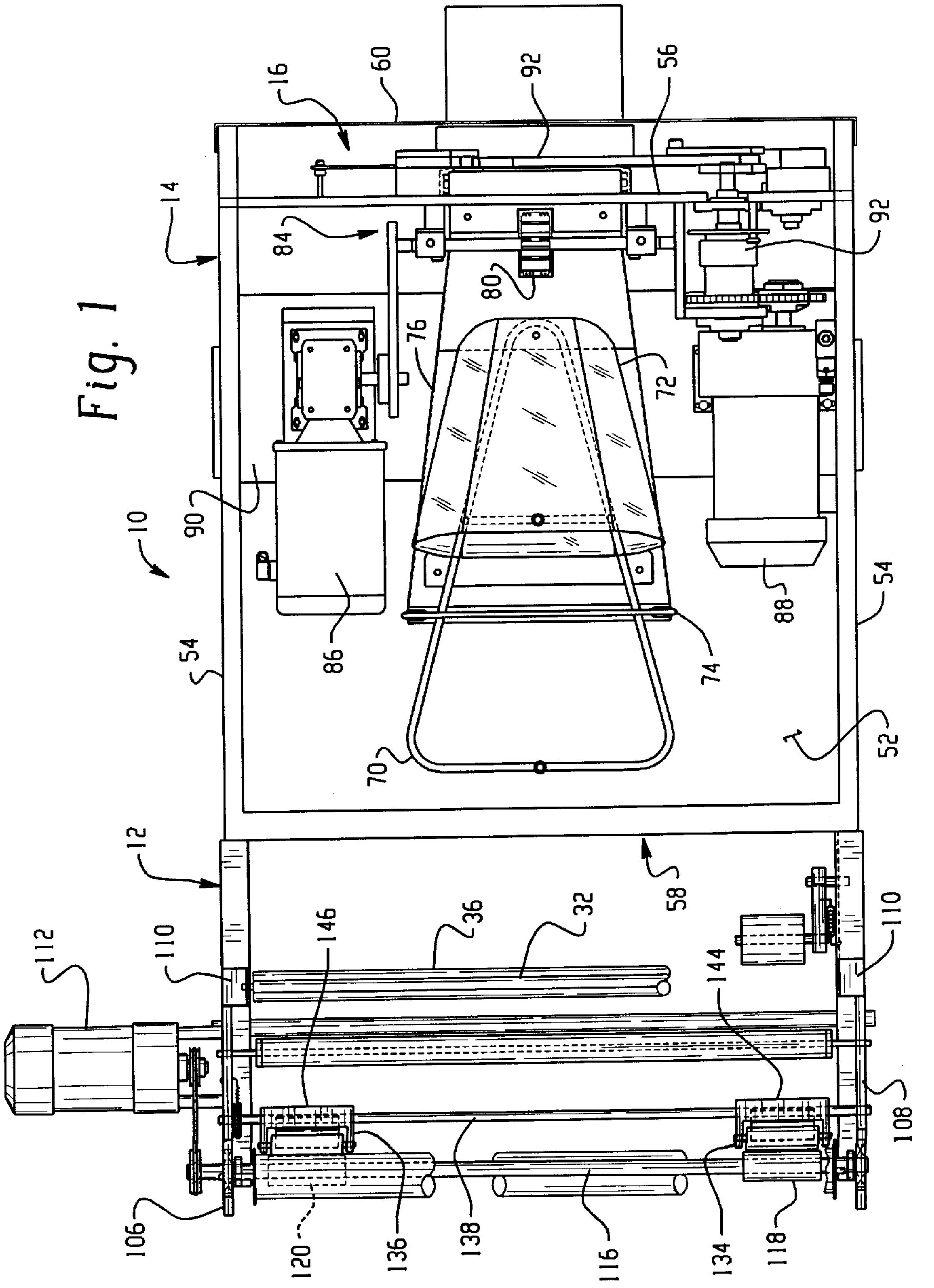
FIG. 1 is a plan view of a dunnage conversion machine constructed in accordance with the present invention.

FIG. 1 illustrates a cushioning conversion machine 10 constructed in accordance with the present invention. The conversion machine 10 includes an infeed unit 12, a forming assembly 14, and a cut off (severing) unit 16. The forming assembly 14 and cut off unit 16 are generally similar to the corresponding components shown in U.S. Pat. No. 5,123,889, the entire disclosure of which is incorporated by reference.

Figure 2:
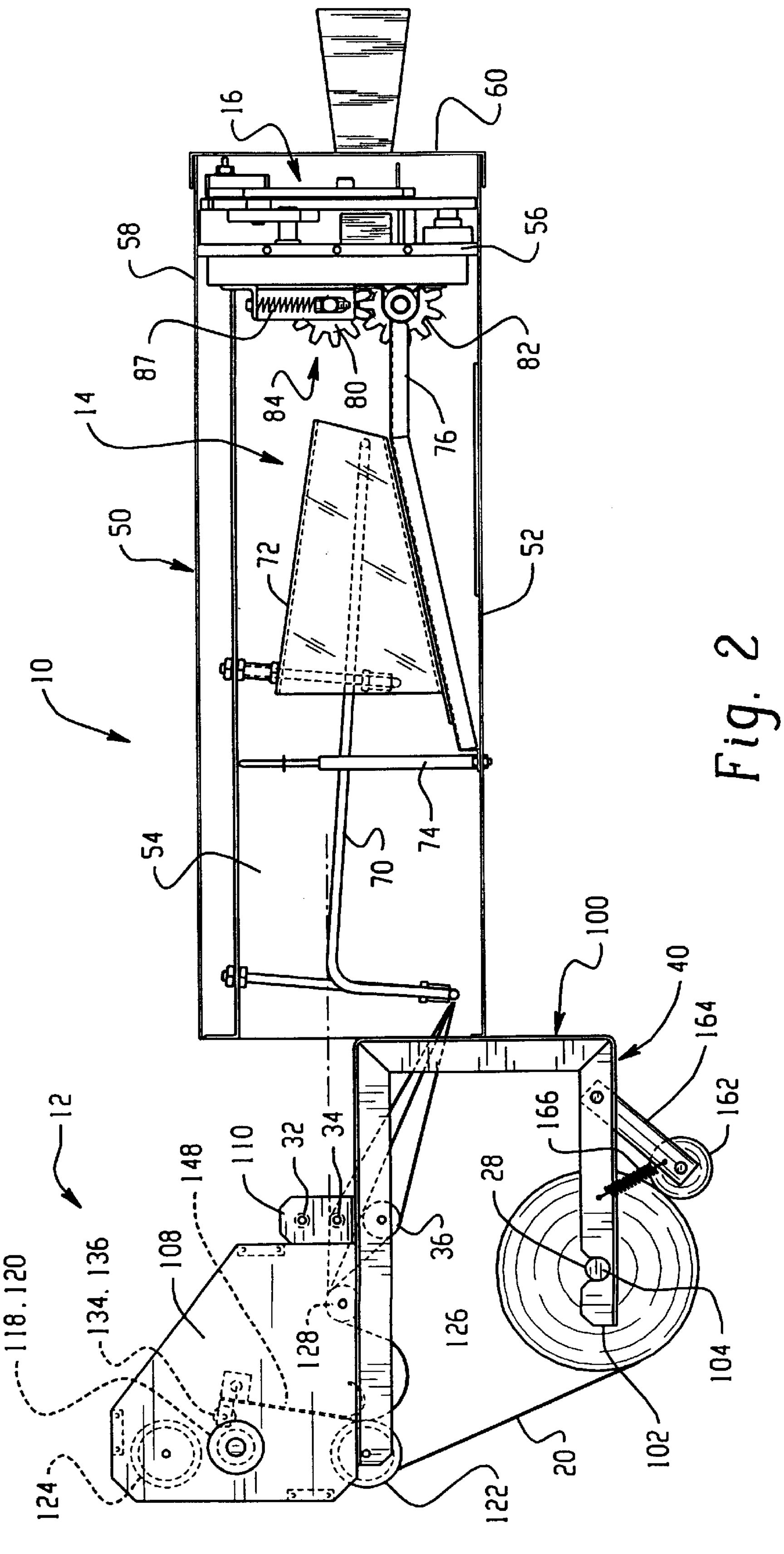
FIG. 2 is a side elevational view of the machine shown in FIG. 1.

The machine 10 is shown in FIG. 2 positioned in a horizontal manner and loaded with a roll 18 of sheet stock material 20. The stock material 20 may consist of three superimposed webs 22, 24, and 26 of biodegradable, recyclable and reusable thirty pound Kraft paper rolled onto a hollow cylindrical tube 28. A thirty inch wide roll of the paper, which is approximately 30 feet long, weighs about 35 pounds and provides cushioning approximately equal to 60 cubic feet of plastic foam peanuts while at the same time requiring less than one thirtieth the storage space.

In use, the conversion machine 10 processes sheet stock material to form dunnage which may be used for packing or shipping purposes. The illustrated conversion machine 10 converts the stock sheet material into a continuous strip of cushioning with lateral pillow portions separated by a thin central band. This strip is "connected" as by coining along the central band and may be cut into sections of a desired length.

The infeed unit 12 may include various bars or rollers 32, 34 and 36 for separating the layers of sheet material 20 before being fed into the forming assembly 14. The infeed unit 12 may also include a holder 40 which may support a roll 18 of sheet material 20. Alternatively, the sheet material 20 may be fed from a separate stand holding the sheet material, or by other suitable means. The infeed unit 12 supplies sheet material to the forming assembly 14 for conversion into dunnage.

The forming assembly 14 is disposed within a housing 50 (FIGS. 1 and 2) having a base plate or wall 52, side plates or walls 54, and an end plate or wall 56 which collectively form a frame structure. The base wall 52 (FIG. 1) is generally planar and rectangular in shape. The housing 50 also includes a top plate 58 (FIG. 2), which together with the base, side and end walls, form an enclosure.

At the upstream end of the housing 50, the base and side walls 52 and 54 together with the top plate 58 form a rectangular border around a centrally located, and relatively large, rectangular stock inlet opening 58. This border may be viewed as an end plate or wall extending perpendicularly from the upstream edge of the base wall 52. It should be noted that the terms "upstream" and "downstream" are herein used in relation to the direction of flow of the stock material 20 through the machine 10. An end plate 56 extends perpendicularly from a location near, but inward from, the downstream end of the base wall 52. The end plate 56 is generally rectangular and planar and includes a dunnage outlet opening (not shown).

The housing 50 also includes a front cover or plate 60 which extends perpendicularly from the downstream edge of the base wall 52 and parallel to end plate 56. Thus, the end plate 56 and front plate 60 bound upstream and downstream ends of a box-like extended portion of the downstream end of the housing 50. The front plate 60 may be a door-like structure which may be selectively opened for access to the cut off unit 16.

The forming assembly 14 (FIGS. 1 and 2) is located downstream of the infeed unit 12 and inside the housing 50. The forming assembly includes various components to shape the sheet material 20 as it passes through the forming assembly into a continuous three-dimensional strip of dunnage having portions of the stock material overlapped along the central region of the strip. Specifically, the forming assembly 14 may include a three dimensional shaping member 70, a converging chute 72, a transverse guide structure 74, and a guide tray 76. The stock material 20 (FIG. 1) travels between the shaping member 70 and the frame base plate 52 until it reaches the guide tray 76. At this point the transverse guide structure 74 and the guide tray 76 guide the stock material 20 longitudinally and transversely into the converging chute 72. During downstream travel, the shaping member 70 inwardly turns the edges of the stock material 20 to form the lateral pillow portions of the finished dunnage product, and the converging chute 72 coacts with the shaping member 70 to form the continuous strip with the desired geometry. As the strip emerges from the converging chute 72, the guide tray 76 guides the strip into gears 80 and 82 which form part of a feeding/connecting assembly 84. The forming assembly 14 and the feeding/connecting assembly 84 form the overall conversion assembly of the conversion machine and thus individually constitute conversion assemblies.

The feeding/connecting assembly 84 includes a drive motor 86 (FIG. 1) which is mounted to the base plate 52 and operatively connected to gear 82. The gear 82 meshes with gear 80 to define a nip through which the continuous strip of sheet material passes after it emerges from the converging chute 72. The gear 82 is biased downward into meshing engagement with the gear 80 by an adjustable spring mechanism 87 (FIG. 2) which is mounted to the upstream side of the end plate 56. When the motor 86 is turned on, the gears 80 and 82 draw the sheet material through the nip between the gears, simultaneously advancing the material through the forming assembly 14 and connecting the strip along a central band.

The cut off unit 16 is mounted to the downstream side of the end plate 56. The cut off unit is powered by a motor 88 which is mounted to the base plate 52. The motors 86 and 88 are preferably mounted on a transverse mounting plate 90, which forms part of the base plate 52, and on opposite sides of the forming assembly 14. The cut off unit includes a blade assembly 92 which is operatively connected through a clutch 94 with the motor 88. When the motor 88 is running and the clutch 92 is engaged, the blade assembly 92 severs the continuous strip into segments of dunnage of a desired length. Reference may be had to U.S. patent application Ser. No. 08/386,355 for a severing assembly similar to that illustrated, or to U.S. patent application Ser. No. 08/110,349 for another type of severing assembly. In addition, a single drive motor may be used for both the forming assembly 14 and the cut off assembly 16 as shown in U.S. patent application Ser. No. 08/478,256, filed Jun. 7, 1995.

In operation a control unit (not shown) controls the motors 86 and 88 as well as the clutch 92. When a desired length of material has been fed out the machine, the motor 86 is stopped and the clutch 92 is engaged to sever the strip. Once the severing operation is complete, the clutch 92 is disengaged and the motor 86 restarted so that another strip of a desired length can be formed and cut to length.

The machine 10 as thus far described is generally the same as the machine described in greater detail in U.S. Patent No. 5,123,889 (hereby incorporated herein by reference) and reference may be had thereto for further details of the general arrangement and operation of the machine. However, it is noted that the illustrated forming assembly 14 is of the type described in pending U.S. patent application Ser. No. 08/386,355 which is hereby incorporated by reference. The forming assembly 14 is similar to that shown in the aforesaid U.S. Pat. No. 5,674,172 which is incorporated herein by reference. As the sheet material passes through the forming assembly 14, it is formed into a continuous unconnected strip. While the forming assembly 14 is preferably like that shown in the above-mentioned U.S. Pat. No. 5,674,172, other forming assemblies are also usable in the practice of the present invention. Reference also may be had to said application for further details of the illustrated forming assembly 14.

As noted above the infeed unit 12 (FIGS. 1, 2 and 3) supplies sheet material 20 to the forming assembly 14. The infeed unit 12 is powered to provide sheet material without excessive tension acting on the stock material and more preferably without any significant variations in tension, as may be caused by the stopping and starting of the feeding/connecting assembly 84 and/or inadvertent hindrance of the stock material feeding. This reduces the amount of tearing and further promotes optimal formation of a dunnage product, e.g., cushioning pads.

Figure 3:
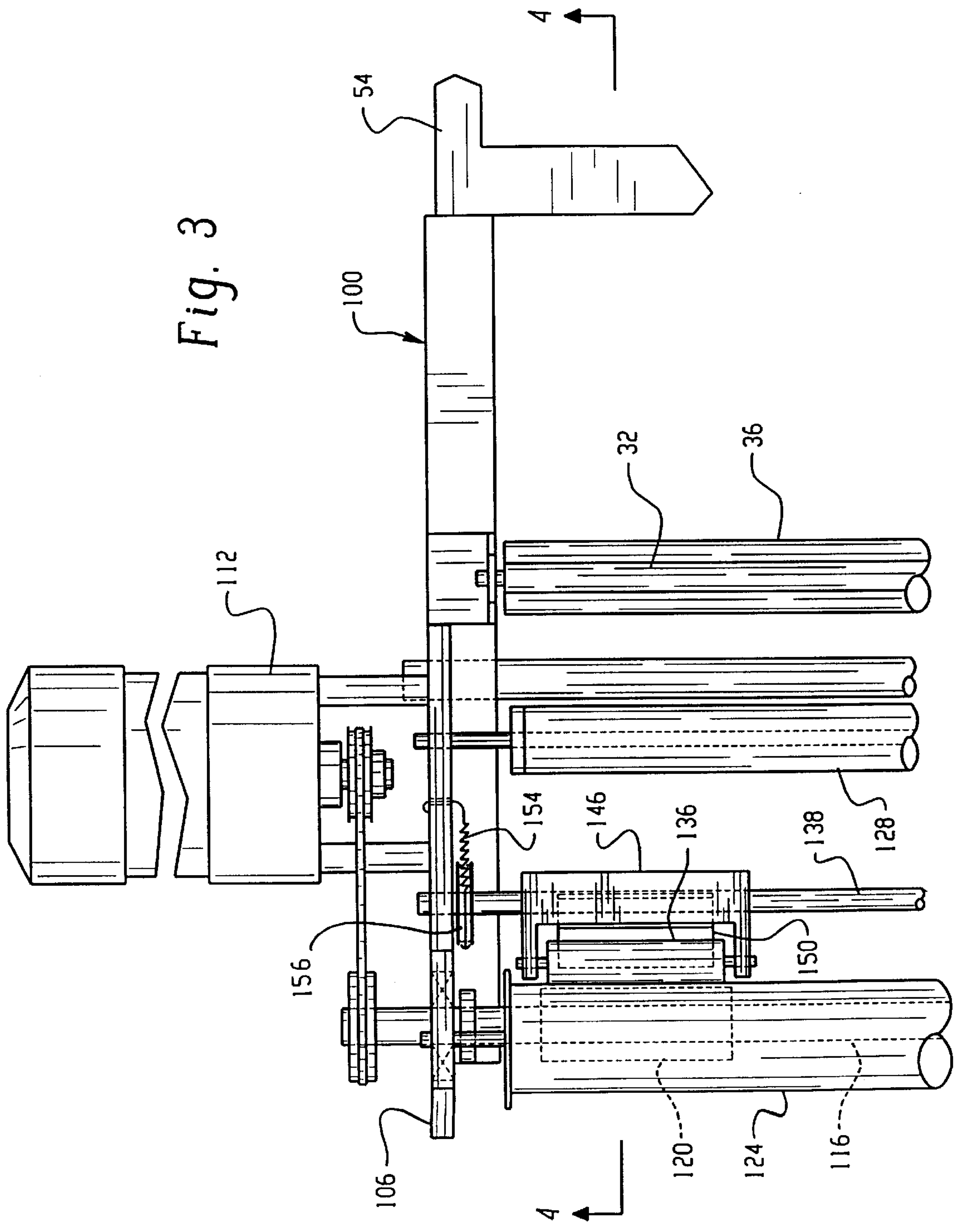
FIG. 3 is an enlarged view of a portion of FIG. 1, showing a power roller and a pressure roller which form a part of the present invention.

The infeed unit 12 is supported by a frame 100 (FIG. 2) which is connected to the upstream end of the housing. The frame 100 includes the holder 40 which is composed of a pair of arms 102 (only one shown) that support opposite ends of an axle 104 on which the roll 18 of sheet material turns. The frame 100 also supports side panels 106 and 108 (FIGS. 1 and 3). The side panels 106 and 108 each lie in a plane that is defined by one of the side plates 54 of the housing 50. The frame 100 also includes brackets 110 that rotatably support the opposite ends of the rollers 32, 34, and 36.

The infeed unit 12 is powered by a motor 112 (FIGS. 1 and 3) that is mounted to side panel 106 (or by other suitable means, such as the feed motor 86 through a suitable drive train). The motor 112 drives a shaft 116 which carries two power rollers 118 and 120. The connection between the motor 112 and the shaft 120 is by any suitable means such as the belt drive shown, or a gear drive, chain drive or other connection means may be used. The power rollers 118 and 120 preferably are smooth steel cylinders, and they are driven by rotation of shaft 138 with a surface speed that is slightly greater than the speed with which the gears 80 and 82 advance the web through the forming assembly 14.

The infeed unit 12 is constructed to bring the sheet material 20 (FIG. 2) into contact with the power rollers 118 and 120 in order to maintain a steady supply of sheet material to the forming assembly 14. To this end, the illustrated preferred infeed unit 12 includes a pair of idler rollers 122 and 124 located below and above the power rollers 118 and 120. The idler rollers span the width of the machine 10 and are rotatably mounted to the side panels 106 and 108 (FIG. 1). The sheet material is fed from the roll 18 around the left side of roller 122 and over the top of roller 124 (as viewed in FIG. 2). From there the web of sheet material moves downward past the powered rollers 118 and 120, forming a loop 126 before extending to a constant entry roller 128. From constant entry roller 128, the web is separated into its three layers by the separator rollers 32, 34 and 36.

A pair of pressure rollers 134 and 136 (FIGS. 1 and 3) are mounted to bring the sheet material 18 into contact with the power rollers 118 and 120 in response to demand for sheet material from the forming assembly 14. A shaft 138 extends between the side panels 106 and 108. A pair of brackets 144 and 146 are mounted to the shaft 138. The brackets 144 and 146 support a respective one of the pressure rollers 134 and 136, respectively, for free rotation about an axis that is parallel to the shaft 116 and the power rollers. The pressure rollers 134 and 136 are located in opposition to the power rollers 118 and 120, and on the opposite side of the sheet material 20. The brackets 144 and 146 are proportioned so that when the shaft 138 rotates in a counterclockwise direction (as viewed in FIG. 2), the pressure rollers 134 and 136 press the sheet material 20 against the power rollers 118 and 120.

Figure 4:
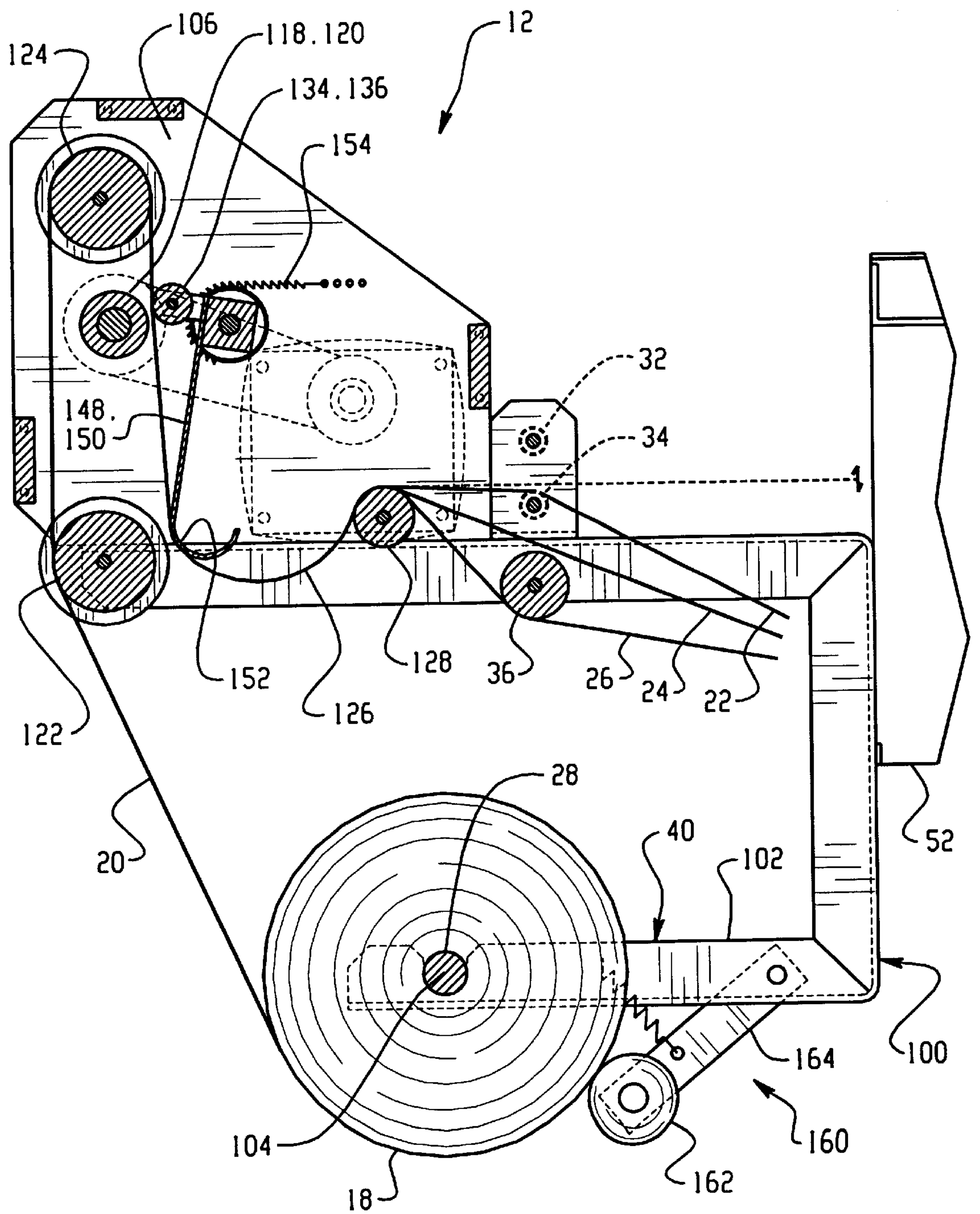
FIG. 4 is a cross-sectional view taken along the line 4—4 of FIG. 3 showing the pressure roll out of engagement with the power roller.
Figure 5:
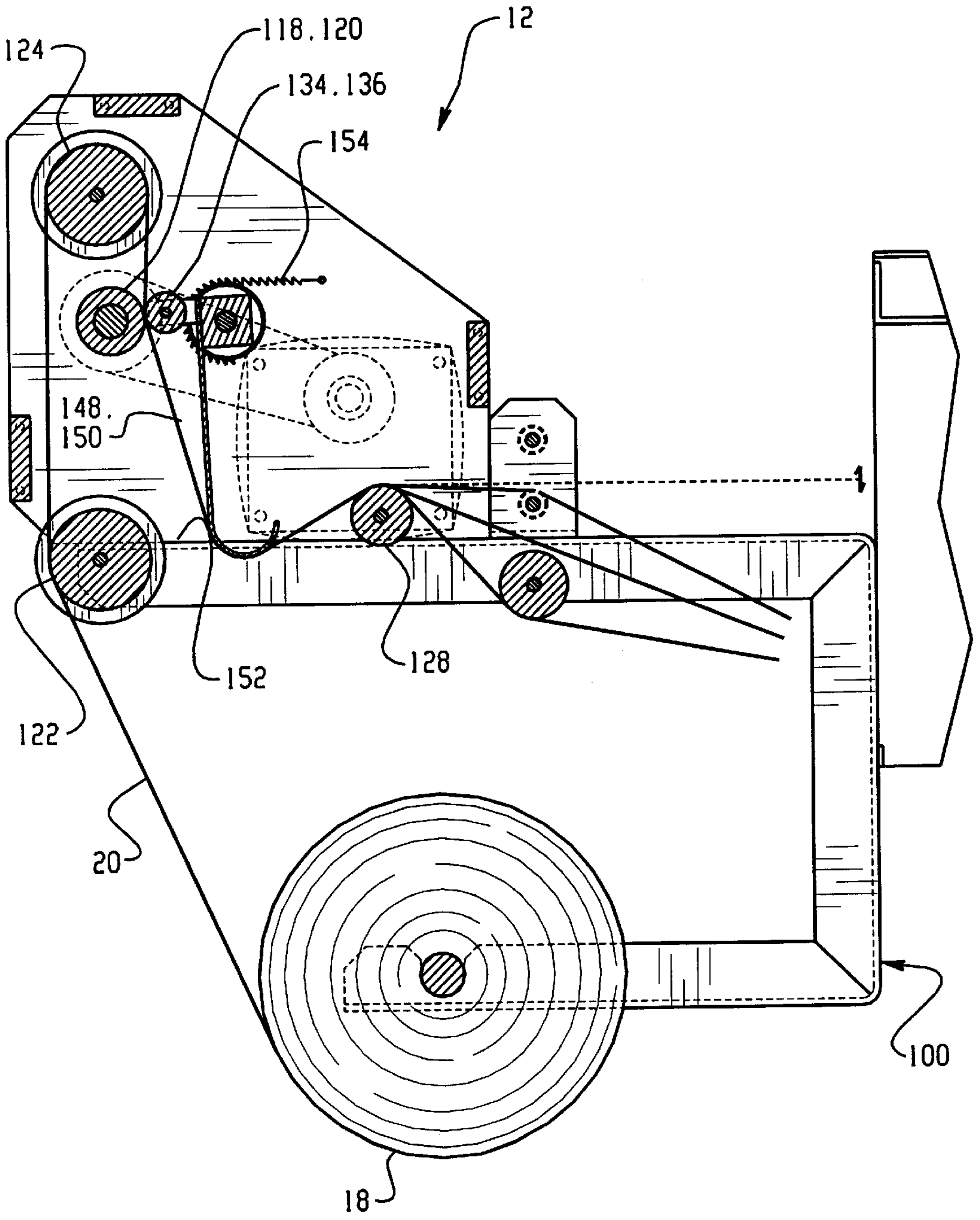
FIG. 5 is a view similar to FIG. 4, but showing the pressure roll pressed against the power roller.

The brackets 144 and 146 also each support a dancer arm 148 and 150, respectively (FIGS. 2 and 4). The two dancer arms 148 and 150 are similar and only the dancer arm 150 will be described in detail. Referring to FIGS. 4 and 5, the dancer arm 150 extends downward from the bracket 146 toward the loop 126. The dancer arm 150 is preferably formed of sheet metal (or other suitable material), and its lower end is curved at 152 to make a smooth glide surface for the sheet material 20 to bear against.

The dancer arm 150 moves between the positions illustrated in FIGS. 4 and 5 in response to movement of the sheet material loop 126. When the gears 80 and 82 begin to advance sheet material through the forming assembly, the loop 126 (FIG. 2) may sag slightly between the rollers 124 and 128, and the sheet material desirably is free of driving contact or engagement with the power (drive) rollers 118 and 120. This is assured because a biasing spring 154 wraps around a pulley 156 which is secured to the shaft 138 and biases the shaft in a clockwise direction, as viewed in FIG. 2.

Because the gears 80 and 82 are pulling initially from the slightly sagging (or even free-hanging loop 126), there is little drag on the sheet material and little chance that the gears will tear the sheet material as they start to rotate or will cause tearing upstream of the gears.

As the sheet material advances, the loop 126 is taken up against the dancer arms 148 and 150. As this continues, the dancer arms 148 and 150 are forced to rotate from the position shown in FIG. 4 toward the position shown in FIG. 5. This counterclockwise rotation causes the pressure rollers 134 and 136 to squeeze the sheet material against the power rollers 118 and 120 whereupon the power roller drivingly engage the stock material and pull it from the stock roll. Because power rollers 118 and 120 are driven with a surface speed that is greater than the speed at which the feeding/connecting assembly 84 draws material through the forming assembly 14, if the pressure rollers 134 and 136 press the sheet material against the power rollers 118 and 120 firmly enough that there is no slippage between the material and the power rollers, the loop 126 will grow in size. However, as the loop grow in size, the pinch force acting on the stock material will be reduced and slippage may occur between the stock material and the power rollers, thereby effectively reducing the feed rate at which the incoming stock material is advanced by the power rollers.

In a steady state of operation, an equilibrium would be reached with some slippage occurring between the sheet material 20 and the power rolls 118 and 120. In addition, in a steady state, there would be some tension in the web downstream of the power rollers 118 and 120. The amount of the tension can be controlled by the tension in the spring 154, which can be made adjustable by any suitable means. As illustrated, there is a series of holes in the side panel 106 which can be used to secure the end of the spring.

During start up, the infeed unit 12 will dampen the tension acting on the stock material which arises from having to overcome the inertial of the stationary stock roll. Most likely, the dancer arm will initially oscillate to some extent. However, whenever the tension in the web of sheet material 20 rises above a preset level (determined by the setting of the spring 154), the dancer arms 148 and 150 bring the pressure roller 134 and 136 into contact with the power rollers 118 and 120 to quickly feed sheet material into the loop 126 and attain a steady state feeding condition.

In order to dampen the system and keep the roll 18 of sheet material 20 from over running, a friction roller assembly 160 preferably is used to provide a constant resistance to rotation to the roll 18, or another type of braking device may be used. The friction roller assembly 160 includes a roller 162 mounted to a swing arm 164 which is pivotally secured to the arms 102. Spring 166 pulls the roller 162 against the surface of the roll 18 to provide a continuous and preferably constant drag. Any suitable means for generating a frictional load on the roller 162 may be used, such as a drum-type brake, a caliper-type brake, or even a set screw which bears down on a turning shaft. The key function, as with any damped feed back controlled system, is to allow the system to respond rapidly without excessive overshooting. In the illustrated arrangement, the braking force will progressively decrease as the diameter of the roll, and thus its inertial mass, decreases.

Thus it is clear that the present invention provides a cushioning conversion machine 10 (FIG. 1) with a power infeed mechanism 12. The machine includes a brake 160 (FIG. 2) applied to the infeed roll 18 of stock material 20 to provide a continuous drag on the material. The material is fed through a nip between a power roller 118, 120 and a pressure roller 134, 136 to form a loop 126 downstream of the nip. The pressure roller 134, 136 is pressed against the material to be converted and the power roll 118, 120 with a force that is controlled by a dancer 148 which rests against the loop 126. When the size of the loop 126 decreases the dancer 148 senses the change and increases the pressure on the sheet material in the nip until the loop is restored to the desired size. Thus the connecting mechanism 84 receives stock material 20 at a constant tension or at a tension that does not exceed a predetermined limit.

Alternative arrangements may be used to control the tension acting on the stock material. Instead of the power and pressure rollers being relatively movable, they may be continuously urged together to engage (pinch) the stock material. In this arrangement, the driving force and/or drag exerted by the power roller may be controlled, as by using a torque motor (or brake) whose applied torque (or drag) is controlled in relation to the tension acting on the stock material. Feedback to the torque motor controller may be supplied by a sensor that monitors the position of the dancer arm, such as an LVDT connected to the dancer arm, or by a sensor that otherwise measures the tension acting on the stock material and provides a feedback signal to the motor controller.

Although the invention has been shown and described with respect to a certain preferred embodiments, equivalent alterations and modifications will occur to others skilled in the art upon reading and understanding this specification and the annexed drawings. In particular regard to the various functions performed by the above described integers (components, assemblies, devices, compositions, etc.), the terms (including a reference to a "means") used to describe such integers are intended to correspond, unless otherwise indicated, to any integer which performs the specified function of the described integer (i.e., that is functionally equivalent), even though not structurally equivalent to the disclosed structure which performs the function in the herein illustrated exemplary embodiment or embodiments of the invention. In addition, while a particular feature of the invention may have been described above with respect to only one of several illustrated embodiments, such feature may be combined with one or more other features of the other embodiments, as may be desired and advantageous for any given or particular application.

What is claimed is:

1. A cushioning conversion machine for converting sheet stock material into a relatively low density cushioning dunnage product, said machine comprising at least one conversion assembly which moves the stock material along a pathway and converts the stock material into a three-dimensional strip of cushioning, and an infeed mechanism which supplies the sheet material to the at least one conversion assembly from a source thereof which causes variations in the tension of the stock material to occur during operation of the conversion machine, the infeed mechanism supplying the sheet material at a controlled tension based on the variations in the tension of the sheet stock material.

2. The machine of claim 1, wherein the infeed mechanism includes a power roller and a pressure roller, the power roller being connected to a drive motor and the pressure roller pressing the sheet material against the power roller to advance the sheet material to the conversion assembly.

3. The machine of claim 2, wherein the power roller is driven at a surface speed which is greater than a feed rate of the stock material through the at least one conversion assembly.

4. The machine of claim 2, including a dancer that rests against the sheet material between the pressure roller and the conversion assembly and moves in response to tension in the sheet material.

5. The machine of claim 4, wherein the dancer is mechanically connected to the pressure roller.

6. The machine of claim 5, wherein the pressure roller is mounted eccentrically of a pivot axis of a shaft and the dancer is connected to the shaft so as to cause rotation of the shaft in response to motion of the dancer.

7. The machine of claim 6, including a damper applying a drag to the sheet material upstream of the power roller.

8. A cushioning conversion machine for converting sheet stock material into a relatively low density cushioning dunnage product, said machine comprising at least one conversion assembly which moves the stock along a pathway and converts the stock material into a three-dimensional strip of cushioning, and an infeed mechanism which supplies the sheet material to be converted at a controlled tension;

wherein the infeed mechanism includes a power roller and a pressure roller, the power roller being connected to a drive motor and the pressure roller pressing the sheet material against the power roller to advance the sheet material to the conversion assembly; and wherein the pressure roller is mounted to move toward and away from the power roller.

9. A method for converting sheet stock material into a relatively low density cushioning dunnage product, comprising the steps of using at least one conversion assembly for moving the stock material along a pathway and converting the stock material into a three-dimensional strip of cushioning, and using an infeed mechanism which supplies the sheet stock material to the at least one conversion assembly from a source thereof which causes variations in the tension of the stock material to occur during operation of the conversion machine, the infeed mechanism supplying the sheet material at a controlled tension based on the variations in the tension of the sheet stock material.

10. A cushioning conversion machine for converting sheet stock material into a relatively low density cushioning dunnage product, said machine comprising at least one conversion assembly which moves the stock along a pathway and converts the stock material into a three-dimensional strip of cushioning, and an infeed mechanism which supplies the sheet material to be converted at a controlled tension;

wherein the infeed mechanism includes a power roller and a pressure roller and the pressure roller is mounted to move toward and away from the power roller, such movement being in response to the tension in the sheet stock material being fed therebetween.

11. The machine of claim 10, wherein when the pressure roller presses the sheet stock material against the power roller, the power roller drivingly engages the sheet stock material, whereby the sheet stock material is fed to the at least one conversion assembly.

12. The machine of claim 11, wherein the rate at which the power roller feeds the sheet stock material varies according to a pinch force exerted by the pressure roller on the sheet stock material.

13. The machine of claim 11, wherein the rate at which the power roller feeds the sheet stock material varies according to the tension in the sheet stock material.

14. The machine of claim 11, wherein the rate at which the power roller feeds the sheet stock material reaches an equilibrium in a steady state operation.

* * * * *